United States Patent [19]

Finch et al.

[11] Patent Number: 4,949,227
[45] Date of Patent: Aug. 14, 1990

[54] UPPER AND LOWER BEAM OPTICAL SWITCH FOR LINE-OF-LIGHT HEADLAMPS USING OPAQUE MASKS

[75] Inventors: William W. Finch, University Heights; John M. Davenport, Lyndhurst; Richard L. Hansler, Pepper Pike, all of Ohio

[73] Assignee: General Electric Company, Schenectady, N.Y.

[21] Appl. No.: 429,746

[22] Filed: Oct. 31, 1989

[51] Int. Cl.$^5$ .............................................. B60Q 1/00
[52] U.S. Cl. ........................................ 362/61; 362/32; 362/232; 362/233; 362/279; 350/96.18
[58] Field of Search ................... 362/32, 61, 232, 233, 362/279, 319, 354; 350/96.18

[56] References Cited

U.S. PATENT DOCUMENTS 4,811,172  3/1989  Davenport et al. .................. 362/61
4,868,718  9/1989  Davenport et al. .................. 362/32

*Primary Examiner*—Stephen F. Husar
*Attorney, Agent, or Firm*—John P. McMahon; Stanley C. Corwin; Fred Jacob

[57] ABSTRACT

A "line-of-light" vehicle lighting system employs a moveable mask to control the beam pattern formed by an plurality of fiber optic light bundles coupled to a single high intensity light source. The lighting system comprises a single high intensity light source coupled to forward illumination devices by means of optical light conducting devices. The forward illumination devices include an arrangement of connectors, a mask member and lens elements. The connectors lodge fiber optic light bundles branched off from the optical light conducting devices and emit light through respective apertures. The mask has a plurality of openings for selectively exposing portions of the apertures which, in combination with the lens elements, form the beam pattern. The mask is moveable between two positions to register first and second openings in the mask with associated apertures to form the high and low beam patterns of the forward lighting system.

10 Claims, 4 Drawing Sheets

UPPER AND LOWER BEAM OPTICAL SWITCH FOR LINE-OF-LIGHT HEADLAMPS USING OPAQUE MASKS

CROSS-REFERENCE TO RELATED APPLICATIONS

The invention described in this application is related in subject matter to that of applications Ser. No. 123,844 filed on Nov. 23, 1987, now U.S. Pat. No. 4,811,172 by John M. Davenport et al. for "Lighting Systems Employing Optical Fibers", Ser. No. 266,129 filed on Nov. 2, 1988, by John M. Davenport et al. for "Centralized Lighting System Employing a High Brightness Light Source", and Ser. No. 322,607 filed on Mar. 13, 1989, now U.S. Pat. No. 4,868,718 by John M. Davenport et al. for "Forward Illumination Lighting System for Vehicles", all of which are assigned to the assignee of this application. The disclosures of these applications are incorporated herein by reference.

BACKGROUND OF THE INVENTION

Field of the Invention

1. The present invention generally relates to vehicle lighting systems of the type which utilize a high brightness light source, such as an arc lamp, coupled to fiber optic light conductors in order to provide forward illumination in aerodynamically styled vehicles. More specifically, this invention relates to an improvement in such lighting systems in which a moveable mask is used to generate multiple beam patterns with a set of fiber optic light conductors coupled to a single light source.

2. Description of the Prior Art

Conventional headlamp systems have met the need to produce upper and lower headlamp beam patterns with two or more light sources, either arc discharge or filaments. Single-headlamp systems (one headlamp on each side of the vehicle) must make compromises relating to performance. Performance trade-offs must be made to provide high and low beam patterns with a single optical system. Differing functions and light distributions of the two patterns make the problem of providing upper and lower beams more complicated than adjusting the aim of a single beam. Two-headlamp systems (two headlamps for each side of the vehicle) provide two optical systems and improve performance in terms of the high and low beam patterns generated, but at the expense of adding headlamps.

U.S. Pat. No. 4,811,172, referenced above, discloses a "line-of-light" lighting system that provides an improved method of producing beam patterns as compared with what can be achieved with conventional headlamp optics. In one embodiment of the "line-of-light" headlamp as disclosed in that patent, the lighting system includes two high intensity light sources which are respectively coupled to first and second pluralities of fiber optic light bundles. Both pluralities of fiber optic light bundles are positioned relative to lens members mounted across the vehicle in a pattern conforming to the shape of the vehicle body. The light from the first high intensity light source provides the low beam forward illumination of the vehicle, and the light from the second high intensity light source provides the high beam forward illumination of the vehicle.

U.S. Pat. No. 4,868,718 discloses an improvement on the system disclosed in U.S. Pat. No. 4,811,172 wherein only one high intensity light source is used while still providing both the low beam and high beam forward illumination of the vehicle. A moveable optical member is arranged between a set of lens elements mounted across a vehicle and the fiber optic light bundles. This moveable optical member comprises a plurality of prisms in an integral bar structure which may be moved from side-to-side or up-and-down. The movement of this "prism-bar" alters the apparent optical position of the fiber optic light bundles relative to the lens elements in such a manner as to provide all of the forward illumination needs of the vehicle from the single light source including high and low beam patterns. The "prism-bar" is advantageous in that it requires only a single light source. However, it requires precise manufacture and alignment, increasing both the cost and fragility of the unit.

SUMMARY OF THE INVENTION

It is therefore an object of the present invention to provide an improved "line-of-light" vehicle lighting system which is capable of projecting two or more overlapping beam patterns from a single high intensity light source.

It is another object of the invention is to provide a single high intensity light source vehicle lighting system which is rugged and inexpensive to manufacture.

Briefly, this invention contemplates the provision of a "line-of-light" vehicle lighting system in which openings in a moveable mask control the beam pattern formed by an plurality of fiber optic light bundles coupled to a single high intensity light source. More particularly, the lighting system comprises a single high intensity light source coupled to forward illumination devices by means of optical light conducting devices. The forward illumination devices include an arrangement of connectors, a mask member and lens elements. The connectors lodge fiber optic light bundles branched off from the optical light conducting devices and emit light through respective apertures. The mask has a plurality of openings for selectively exposing the apertures which, in combination with the lens elements, form the beam pattern. The mask is linearly movable between two positions to register first and second openings in the mask with associated apertures to form the high and low beam patterns of the forward lighting system. The arrangement is easy and inexpensive to manufacture resulting in a lightweight and rugged lighting system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
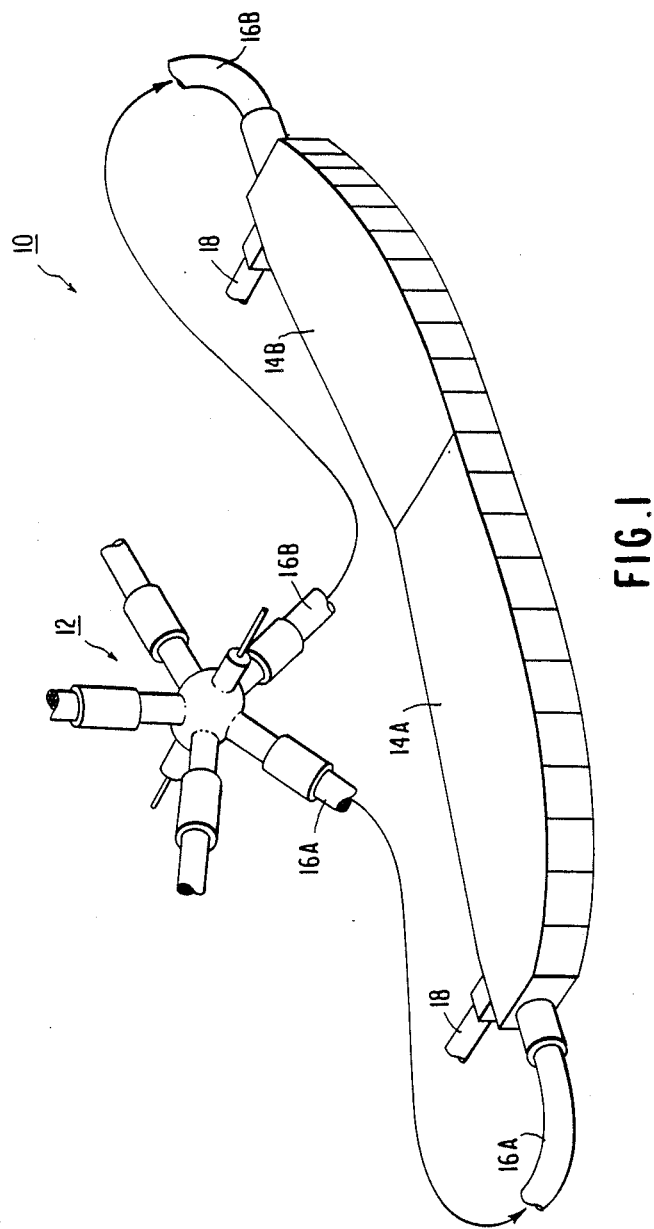
FIG. 1 is a schematic drawing of a "line-of-light" vehicular forward lighting system to which this invention relates.

In the drawings, like reference numerals designate the same or similar structure throughout the several figures. Referring now to the drawings, and more particularly to FIG. 1, the lighting system 10 of the present invention has a single high intensity light source 12 that provides all of the lumens to serve the forward illumination needs, as well as the rearward and interior illumination needs (not shown), for a vehicle. The light source 12 may be of the type described in in U.S. Pat. application Ser. No. 266,129 referenced above. The present invention is primarily related to providing the forward illumination of the vehicle and, therefore, only the facilities of the light source 12 related to such illumination is described.

The low and high beam forward illumination is provided by illumination devices 14A and 14B that are respectively coupled to the light source 12 by means of optical light conducting devices 16A and 16B. The illuminating devices 14A and 14B each have a connector 18 that routes electric power to an electrically activated device 20, to be described with reference to FIG. 2 below. The optical light conducting devices 16A and 16B may have various embodiments which are described in the aforementioned application Ser. No. 266,129.

Figure 2:
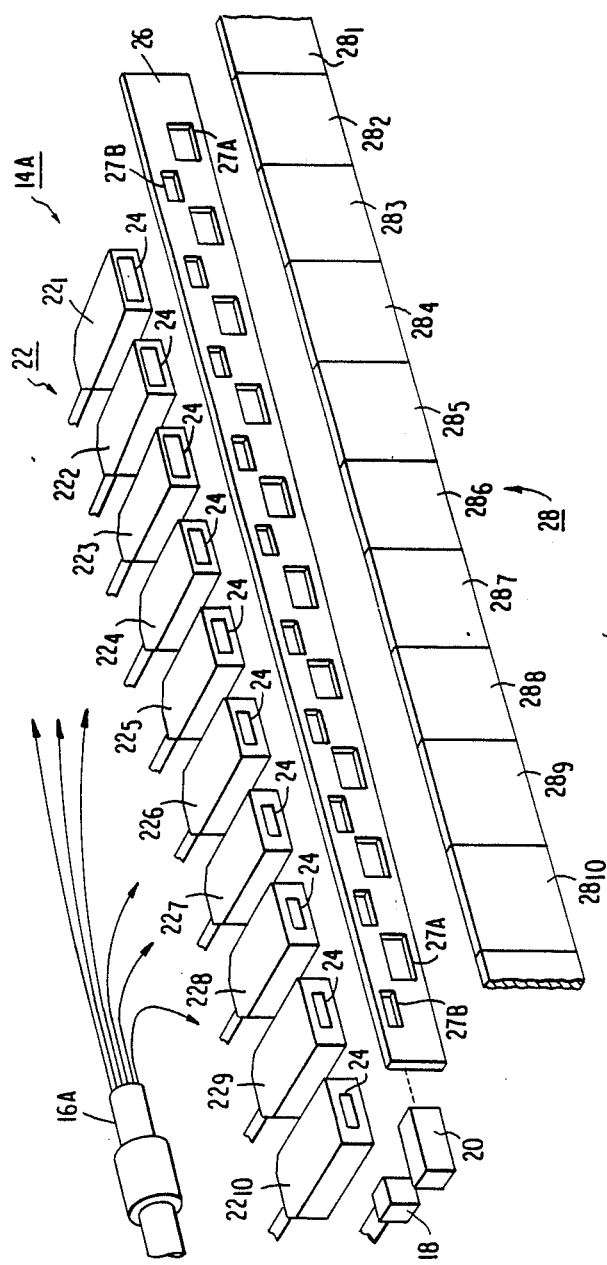
FIG. 2 illustrates an arrangement of an illumination device constructed in accordance with the teachings of the present invention.

The illumination devices 14A and 14B each have an arrangement that is shown in more detail in FIG. 2 for illuminating device 14A. FIG. 2 partially illustrates the illumination device 14A as comprising an arrangement of connectors 22, a mask member 26 and lens elements 28. The connector arrangement 22 is comprised of a plurality of connectors $22_1, 22_2, \ldots, 22_n$ which lodges the fiber optic light bundles branched off from the optical light conducting device 16A. The ends of the fiber optic light bundles of the connectors emit light through respective apertures 24. FIG. 2 further partially illustrates illumination device 14A as comprising a mask 26 having a plurality of openings 27A and 27B. Further, the mask is movable by means of a linear displacement device 20, such as a solenoid, between first and second horizontal positions. The lens elements $28_1, 28_2, \ldots, 28_n$ may be of the type described in the aforementioned application Ser. No. 266,129.

In the so-called "line-of-light" system, a combination of connectors $22_1, 22_2, \ldots, 22_n$ and their associated lens elements $28_1, 28_2, \ldots, 28_n$ form a desired beam pattern. The plane of the aperture 24 of each connector 22 is in, or close to, the focal plane of its associated lens 28. The moveable mask 26 with its openings varies the intensity and beam pattern of selected ones of the connector 22 and lens 28 combination to change the overall beam pattern, such as between high and low beam patterns, as will be explained in greater detail in connection with the remaining figures. A typical automotive headlamp system would employ between ten and twenty connector 22 and lens 28 combinations for each side of a vehicle.

Figure 3A:
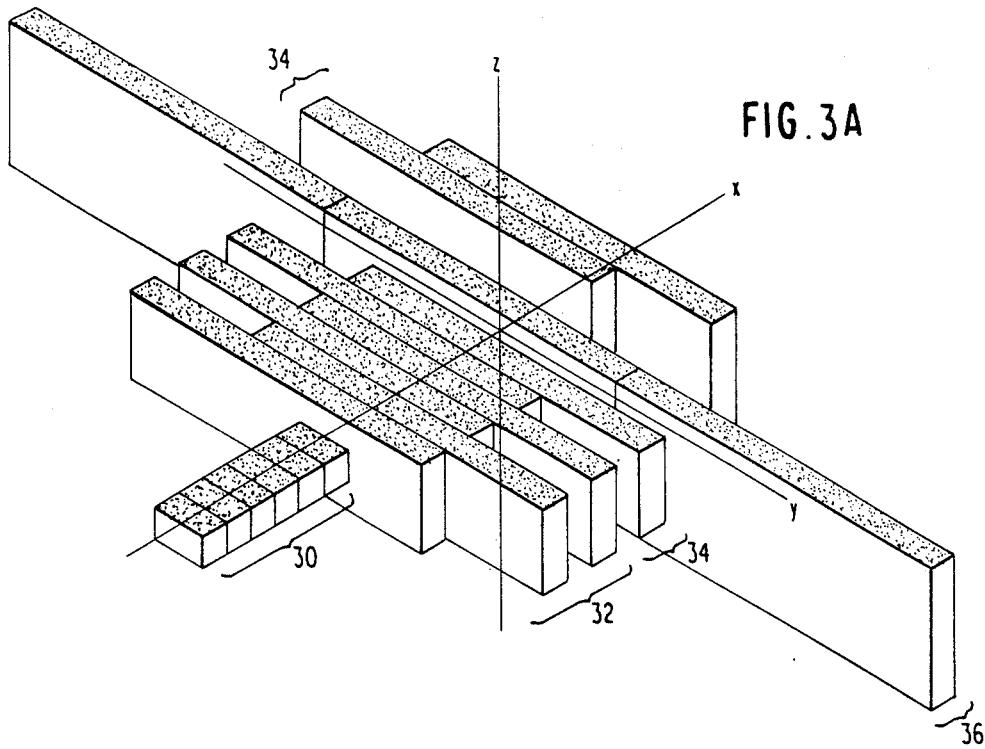
FIGS. 3A and 3B are respectively diagrammatic representations of typical high and low headlamp beam patterns for "line-of-light" forward lighting systems.
Figure 3B:
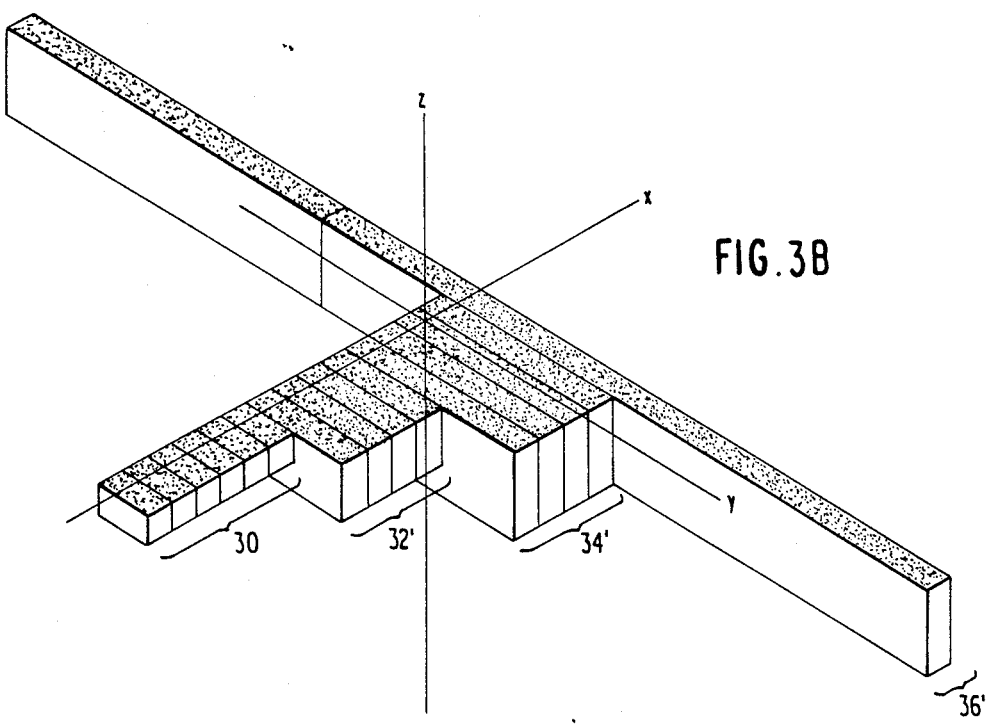

FIGS. 3A and 3B illustrate diagrammatically typical beam patterns for respectively high and low beam patterns for the case where there are seventeen connector 22 and lens 28 combinations. Each block represents the contribution in lumens of a single one of the connector 22 and lens 28 combinations. The blocks are "stacked" in the x axis which is the axis of the beam. In other words, the beams from each of the connector 22 and lens 28 combinations overlap along the x axis. The areas of the blocks in the y-z plane represents the relative beam intensity in lumens for a particular connector 22 and lens 28 combination.

As will be appreciated by those skilled in the art, the "seeing distance" of a beam is a function of the intensity of the source, and with a line of connector 22 and lens 28 combinations, the intensity of the beam is increased by aligning those combinations so their individual beams overlap. The extent of the blocks in a y axis direction indicates the relative horizontal spread of the beam, and the extent of the blocks in the z axis direction indicates its vertical spread.

As an inspection of FIGS. 3A and 3B indicates, in general switching from high to low beam requires limiting the vertical spread of the beam by limiting the light above the horizontal and diminishing its intensity in the central region. This is accomplished by the movement of the mask 26 shown in FIG. 2 as will be described in more detail hereinbelow. However, it may be appreciated at this point in the discussion that there are four subsets of connector 22 and lens combinations 28 which produce the beam patterns represented by the blocks in FIGS. 3A and 3B. There is a first subset of six that produces the beam patterns represented by the blocks 30, a second subset of four that produces the beam patterns represented by the blocks 32 and 32′, a third subset of four that produces the beam patterns represented by the blocks 34 and 34′, and a final subset of three that produces the beam patterns represented by the blocks 36 and 36′. It will also be observed that the blocks 30 are the same in both FIGS. 3A and 3B, and it will be understood that the beam patterns for this subset are unaltered between the high and low beam patterns. The variations between the blocks 32 and 32′, between blocks 34 and 34′ and between blocks 36 and 36′ is accomplished by means of the mask 26. The variation in relative intensities between the several subsets of blocks is accomplished by variation in the sizes of the apertures 24, as described in more detail in the aforementioned U.S. Pat. No. 4,868,718. Alternatively, rather than varying the sizes of the apertures, the sizes of the openings in the mask 26 may be varied. This approach has the advantage of standardizing the manufacture of the connectors 22, although there is some inefficiency due to the fact that not all the light transmitted by the fiber optic light bundles will be used due to blockage of light by the mask.

Figure 4A:
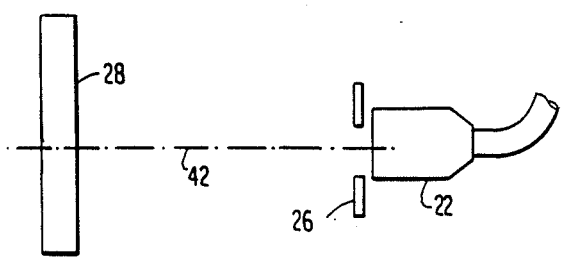
FIGS. 4A and 4B are respectively a schematic side view and partial front view of a light conductor and mask arrangement with the mask in a first position for forming a high beam.
Figure 4B:
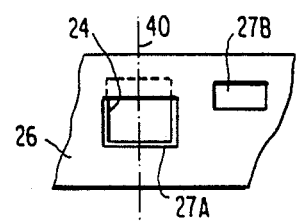

In one embodiment of a vehicular headlamp system in accordance with the teachings of this invention, a series of connectors 22 having apertures 24 of appropriate sizes and generally rectangular shapes are so aligned with respect to their respective lenses 28 that in an unmasked state, the beams of the connector 22 and lens 28 combinations combine in overlapping and partially overlapping patterns to form a desired high beam pattern, such as illustrated in FIG. 3A. FIGS. 4A and 4B show an enlarged side view of a single connector 22 and lens 28 combination and segment of mask 26 interposed therebetween.

With specific reference to FIGS. 4A and 4B, the illuminating aperture 24 of connector 22 is rectangular in shape with the vertical center line of the aperture 24 and the vertical center line of the lens 28 so disposed relative to one another as to produce a beam pattern in a desired direction. These center lines are denoted by the reference numeral 40 in FIG. 4B. The longitudinal axis 42 of connector 22 is similarly disposed relative to the center of the lens 28 so as to produce a desired beam pattern. The aperture 24 of the connector 22 is located in the focal plane of the lens 28. The moveable mask 26 is also disposed in or near the focal plane of the lens 28. The lens 28 forms or projects an image of the aperture 24 exposed by the mask 26. The shape of image and its position relative to the lens axis depend on the shape and location of the exposed aperture in the focal plane relative to the lens. Changing the shape and/or position of the exposed aperture 24 relative to the lens 28 changes the beam pattern from this particular connector 22 and lens 28 combination. In the mask position of FIG. 4B, the mask opening 27A is aligned with aperture 24. Owing to the orientation of aperture 24 relative to lens 28, the projected beam will have components above and below the horizontal.

Figure 5A:
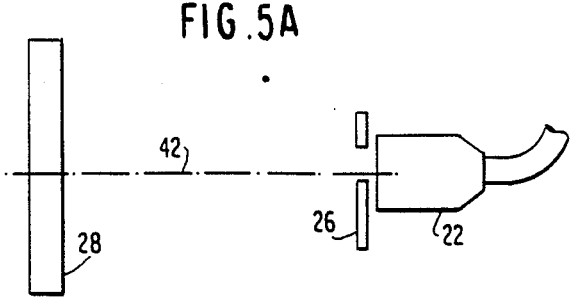
FIGS. 5A and 5B are the same views as in FIGS. 4A and 4B but with the mask in a second position for forming a low beam.
Figure 5B:
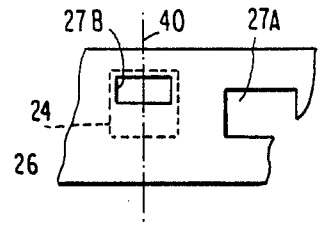

In a second position of the mask 26, illustrated in FIGS. 5A and 5B, the mask 26 has moved so that a second opening 27B is positioned to partially mask the aperture 24. The opening 27B in the mask is such that the mask blocks the light from aperture 24 below the lens axis 42 and, owing to the inversion of the image of the aperture by lens 28, the beam will be directed downwardly below the horizontal.

Figure 6A:
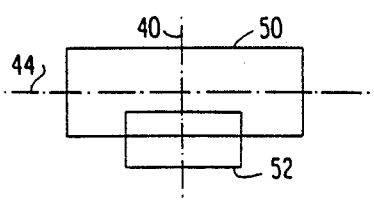
FIGS. 6A, 6B and 6C show respectively an advantageous geometry for beam images, an aperture for forming the beam images and a mask used on cooperation with the aperture to form the images.

It will be appreciated that various openings in the mask 26 may be used to shape the exposed apertures 24 of individual connectors 22 thus controlling the intensity and direction of the beam pattern formed by each connector 22 and lens 28 combination and consequently the overall beam pattern formed. The images for each beam pattern may be such that one is wholly contained in the other; however, advantageously for at least some of the apertures 24, the images used to construct a high and low beam patterns would overlap in such a way that neither is totally contained within the other. Referring to FIG. 6A, a rectangular box 50 outlines the image desired to form the high beam. The image would be centered relative to the horizontal axis 44 and vertical axis 40 of a lens. A smaller box 52 outlines the image desired to form the low beam. This image would be centered with respect to the vertical axis 40 but lie below the horizontal axis 44 of the lens, and thus for a single lens system, the two images would partially overlap without either wholly containing the other, as is shown.

Figure 6B:
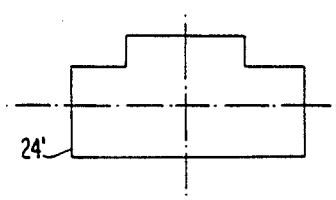
Figure 6C:
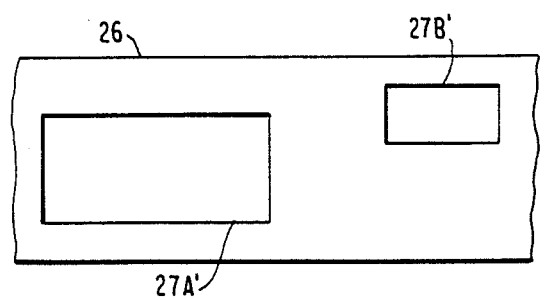

A non-rectangular aperture 24', shown in FIG. 6B, extends over an area sufficient to provide the light for both patterns outlined in FIG. 6A. In this embodiment, aperture 24' is the inverted image of the composite of the images shown in FIG. 6A. This is an efficient use of the fibers in a fiber optic light bundle since all fiber ends will be exposed by either high and low beam openings 27A' and 27B' in mask 26 shown in FIG. 6C. More particularly, FIG. 6C shows the mask 26 with two openings 27A' and 27B' shaped and positioned to produce the images 50 and 52, respectively, shown in FIG. 6A when positioned with respect to an aperture 24' configured as shown in FIG. 6B. It should be noted that the object and image for the high and low beams are respectively inverted by the lens with respect to the horizontal axis and vertical axis. The position of the projected image depends on the position of the aperture 24' in the object plane of the lens. Maximum brightness requirements for a low beam are roughly half that for a high beam. Therefore, when switching from the high beam to the low beam, the lumen output of the light source 12 coupled to the optical light conduction devices 16A and 16B, shown in FIG. 1, may be decreased concurrently with the movement of the mask.

The mask 26 may be constructed of a thin piece of opaque metal or plastic. With a lightweight, one-piece mask, a single, small linear displacement device 20, such as an electromechanical solenoid or linear motor, may be used for an illuminating device 14A or 14B, as shown in FIG. 2. While the preferred embodiment of the invention described contemplates horizontal movement of the mask 26, it will be understood that the mask could be moved vertically with equal effect. In such an arrangement, instead of the openings 27A and 27B being oriented side-by-side, they would be one atop the other.

The opaque mask 26 allows the projection of one of multiple overlapping images from a single aperture 24. The dimensions and location of the images for each connector 22 and lens 28 combination may be adjusted independently to build differently shaped light distributions by providing mask openings and apertures of different size and/or arrangement. More than two distinct beam patterns are possible if more than two sets of openings are formed in the mask and a motion system with the required number of discrete positions is used. Thin film filters over the mask openings can be used to independently control the color and intensity of the light from each connector 22 and lens 28 combination. This may be used for fog lights, emergency signals, or other applications.

Thus it will be appreciated the objects of the invention are achieved. The opaque mask 26 allows selective projection of one of at least two images which may be overlapping. The mask does not add surface reflection losses from additional optics in the headlamp system. Furthermore, the opaque mask design is rugged, capable of withstanding the extreme operating conditions of an automotive headlamp system without a decrease in performance.

Since every optic fiber light bundle is illuminated whenever the forward illumination system is in use, switching of the bundles at the light source is not necessary, which reduces the cost of the system. There is no reduction in headlamp performance as a result of tradeoffs made to provide two beams from a single set of projecting optics.

While the invention has been described in terms of a preferred embodiment and variations thereof, those skilled in the art will recognize that the invention can be practiced with modification within the spirit and scope of the appended claims.

Having thus described our invention, what we claim as new and desire to secure by Letters Patent is as follows:

1. A vehicle forward lighting system for selectively projecting a plurality of beam patterns, comprising in combination;
   a high intensity light source;
   a plurality of optical light conductors, one end of each said conductor optically coupled to said light source and another end of each said conductor terminating in a connector having an aperture forming a light emitting area;
   a plurality of lens elements, each lens element being positioned in front of a corresponding aperture for projecting an image of said aperture, the projection of a plurality of said images forming a beam pattern; and an opaque mask having at least first and second openings therein for each said aperture, said mask being movable between at least first and second positions to move either said first or said second opening into registry with a corresponding aperture, said forward lighting system projecting a first beam pattern when said mask is in said first position and projecting a second beam pattern when said mask is in said second position.

2. The vehicle forward lighting system recited in claim 1 wherein said first opening which, when in registry with said aperture, is coextensive with its corresponding aperture and with the corresponding lens element contributes to forming a high beam pattern.

3. The vehicle forward lighting system recited in claim 2 wherein said second opening is smaller than said first opening and which, when in registry with said aperture, only partially exposes said aperture above a horizontal center line bisecting said aperture into upper and lower halves and with the corresponding lens element contributes to forming a low beam pattern.

4. The vehicle forward lighting system recited in claim 1 wherein in said first opening is larger than said second opening and which, when in registry with said aperture, partially exposes a lower area of said aperture and with the corresponding lens element contributes to forming a high beam pattern.

5. The vehicle forward lighting system recited in claim 4 wherein said second opening, when in registry with said aperture, partially exposes an upper area of said aperture and with the corresponding lens element contributes to forming a low beam pattern.

6. The vehicle forward lighting system recited in claim 1 further comprising linear displacement means connected to said opaque mask for moving said mask between said first and second positions.

7. The vehicle forward lighting system recited in claim 1 wherein said light emitting areas of said conductors are rectangular.

8. The vehicle forward lighting system recited in claim 7 wherein said light emitting areas are of different sizes to control the intensity of light by each conductor and lens element combination.

9. The vehicle forward lighting system recited in claim 7 wherein said first and said second openings are each of different sizes to control the intensity of light by each conductor and lens element combination.

10. The vehicle forward lighting system recited in claim 1 wherein said light emitting areas of said conductors are non-rectangular.

* * * * *